(12) United States Patent
Choo et al.

(10) Patent No.: US 7,405,878 B2
(45) Date of Patent: Jul. 29, 2008

(54) METHOD OF TRANSFORMING A LIGHT BEAM, OPTICAL FILM FOR PERFORMING THE METHOD, AND DISPLAY DEVICE HAVING THE OPTICAL FILM

(75) Inventors: Dae-Ho Choo, Yongin-si (KR); Jin-Hyuk Yun, Seoul (KR); Ho-Min Kang, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 102 days.

(21) Appl. No.: 11/188,105

(22) Filed: Jul. 25, 2005

(65) Prior Publication Data

US 2006/0023128 A1    Feb. 2, 2006

(30) Foreign Application Priority Data

Jul. 26, 2004    (KR) ...................... 10-2004-0058410

(51) Int. Cl.
  *G02B 5/30* (2006.01)

(52) U.S. Cl. ...................................................... 359/491
(58) Field of Classification Search ...................... None
  See application file for complete search history.

(56) References Cited

U.S. PATENT DOCUMENTS 7,232,594 B2 *  6/2007  Miroshin et al. ........... 428/1.31

* cited by examiner

*Primary Examiner*—Sung Pak
*Assistant Examiner*—Hoang Tran
(74) *Attorney, Agent, or Firm*—F. Chau & Associates, LLC (57) ABSTRACT

In a method of transforming light, an optical film for performing the method and a display device having the optical film, an optical film includes an anisotropic film, an isotropic film, a $\lambda/4$ phase difference film and a $\lambda/2$ phase difference film. The anisotropic film having a first refractive index with respect to a first ray and a second refractive index with respect to a second ray. A refractive index of the isotropic film is substantially identical to the first refractive index. The $\lambda/4$ phase difference film delays wavelengths of the first and second rays by about $\lambda/4$. The $\lambda/2$ phase difference film delays the wavelength of the second ray by about $\lambda/2$.

11 Claims, 7 Drawing Sheets

METHOD OF TRANSFORMING A LIGHT BEAM, OPTICAL FILM FOR PERFORMING THE METHOD, AND DISPLAY DEVICE HAVING THE OPTICAL FILM

CROSS REFERENCE TO RELATED APPLICATION

This application claims priority to and the benefit of Korean Patent Application No. 10-2004-0058410 filed on Jul. 26, 2004, which is hereby incorporated by reference for all purposes as if fully set forth herein.

BACKGROUND OF THE INVENTION

1. Field of the Invention

The present invention relates to a display device. More particularly, the present invention relates to a method of transforming a light beam capable of improving a light transparency, an optical film for performing the method and a display device having the optical film.

2. Description of the Related Art

Liquid crystal display devices are generally classified as a transmission type liquid crystal display (LCD) device, a reflective type LCD device, or a reflective and transmissive type LCD device. The transmission type LCD device uses a rear light to display an image. The reflective type LCD device uses a front light to display an image. The reflective and transmissive type LCD device uses both the rear light and the front light to display an image.

Both the reflective type LCD device and the reflective and transmissive type LCD device include a polarizing film/color filter/reflection plate structure and the reflectivity of both devices is approximately 6% to 8%, which is substantially lower than the reflectivity of the transmission type LCD device. Thus, the reflective type LCD device and the reflective and transmissive type LCD are not sufficient as a portable small size liquid crystal display panel. Light transmittances of the polarizing film and the color filter are approximately 43% and approximately 30%, respectively, therefore, light transmittance of the reflective type LCD device or the reflective and transmissive type LCD is low.

SUMMARY OF THE INVENTION

The present invention provides a method of transforming a light capable of improving a light transparency to improve a reflection rate.

Additional features of the invention will be set forth in the description which follows, and in part will be apparent from the description, or may be learned by practice of the invention.

The present invention discloses a method of transforming a light beam provided from a first side, the light beam including a first component and a second component, the method including transmitting and firstly advancing a first ray having the first component to firstly advance toward a second side that is opposite to the first side, firstly partially reflecting a second ray having the second component toward the first side, and firstly partially transmitting the second ray toward the second side, and transmitting and secondly advancing the first ray toward the second side, secondly partially reflecting the firstly transmitted second ray toward the first side, and secondly partially transmitting the firstly transmitted second ray toward the second side.

The present invention also discloses an optical film, including an anisotropic film having a first refractive index for a first ray and a second refractive index for a second ray, the first ray and the second ray being included in a light that is incident upon the anisotropic film from a first side in an incident direction, the first ray is polarized in a first direction that is substantially perpendicular to the incident direction, the second ray is polarized in a second direction that is substantially perpendicular to the incident direction, the second ray including a first component and a second component, the first ray and the second component of the second ray irradiate from the anisotropic film, an isotropic film provided below the anisotropic film, the isotropic film having a third refractive index that is substantially identical to the first refractive index such that the first ray and the second component of the second ray pass through the isotropic film, a $\lambda/4$ phase difference film provided below the isotropic film to delay a wavelength of the first ray and the second component of the second ray by approximately $\lambda/4$ when the first ray and the second component of the second ray pass through the $\lambda/4$ phase difference film, and a $\lambda/2$ phase difference film partially formed below the $\lambda/4$ phase difference film to delay the wavelength of the second component of the second ray by approximately $\lambda/2$ when the second component of the second ray passes through the $\lambda/2$ phase difference film and irradiates toward a second side that is opposite to the first side.

The present invention also discloses a display device, including a liquid crystal display panel including a liquid crystal layer, and an optical film positioned on a side of the liquid crystal display panel, the optical film including an anisotropic layer having a first refractive index for a first ray and a second refractive index for a second ray, the first ray and the second ray being included in a light that is incident upon the anisotropic layer from a first side in an incident direction, the first ray is polarized in a first direction that is substantially perpendicular to the incident direction, the second ray is polarized in a second direction that is substantially perpendicular to the incident direction, the second ray comprising a first component and a second component, the first ray and the second component of the second ray irradiate from the anisotropic layer, an isotropic layer provided below the anisotropic layer, the isotropic layer having a third refractive index that is substantially identical to the first refractive index so that the first ray and the second component of the second ray, which irradiate from the anisotropic layer, pass through the isotropic layer, a $\lambda/4$ phase difference layer formed below the isotropic layer to delay a wavelength of the first ray and the second component of the second ray, which irradiate from the isotropic layer by approximately $\lambda/4$, when the first ray and the second ray pass through the $\lambda/4$ phase difference layer, and a $\lambda/2$ phase difference layer partially provided below the $\lambda/4$ phase difference layer to delay the wavelength of the second component of the second ray by approximately $\lambda/2$ when the second component of the second ray passes through the $\lambda/2$ phase difference layer and irradiates toward a second side that is opposite to the first side.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. It is understood that when an element or layer is referred to as being "on" or "connected to" or "connected with" another element or layer, it can be directly on or directly connected to or with the other element or layer or intervening elements or layers may be present.

Like reference numerals refer to like elements throughout.

It is understood that, although the terms first, second, etc. may be used herein to describe various elements, components or layers, these elements, components or layers should not be limited by these terms. These terms are used to distinguish one element, component or layer from another element, component or layer. Thus, a first element, component or layer discussed below could be termed a second element, component or layer without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It is understood that the spatially relative terms are intended to encompass different orientations of the device in use or operation in addition to the orientation shown in the figures. For example, when the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

The terminology used herein is for the purpose of describing particular embodiments only and does not limit the invention. As used herein, the singular forms "a", "an" and "the" are intended to include the plural forms as well, unless the context clearly indicates otherwise. It is further understood that the terms "comprises" and/or "comprising," when used in this specification, specify the presence of stated features, elements or components, but do not preclude the presence or addition of one or more other features, elements or components, Unless the contest clearly indicates otherwise.

Unless otherwise defined, all terms (including technical and scientific terms) used herein have the same meaning as commonly understood by one of ordinary skill in the art to which this invention belongs. It is further understood that terms, such as those defined in commonly used dictionaries, should be interpreted as having a meaning that is consistent with their meaning in the context of the relevant art and will not be specially defined unless expressly defined herein.

Various embodiments of the present invention are described below with reference to the accompanying drawings.

When a light sequentially propagates or travels through at least one medium, a reflectivity and a transmittance relate to a refractive index. In general, as the refractive index increases, the reflectivity may also increase. When the refractive index decreases, the transmittance may increase.

A wavelength of a light is substantially inversely proportional to a refractive index (n). Formula 1 below shows a relationship between the wavelength of the light and the refractive index (n).

$$n \propto 1/\lambda \quad \text{Formula 1}$$

Figure 1:
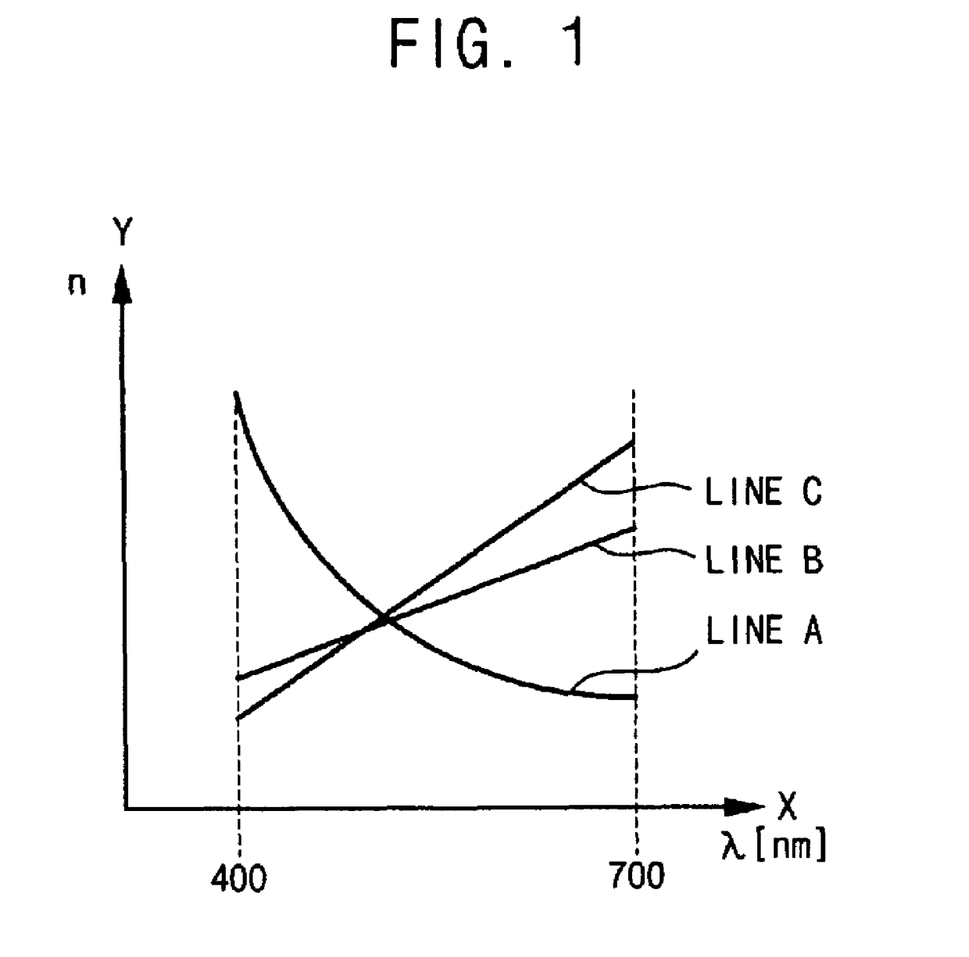
FIG. 1 is a graph showing a refractive index (n) of a medium where a visible ray passes as a function of a wavelength of the light.

FIG. 1 is a graph showing a refractive index (n) of a medium where a visible ray passes as a function of a wavelength of the light.

In FIG. 1, an X-axis and a Y-axis indicate a wavelength of a visible ray and a refractive index, respectively. The wavelength of the visible ray is approximately about 400 nm to about 700 nm.

In detail, a line "A" shows a relationship between a wavelength of a visible ray and a refractive index of a medium that does not have a polarizing transition member such as a $\lambda/2$ phase difference film. A line "B" shows a relation between a wavelength of a visible ray and a refractive index of the polarizing transition member. A line "C" shows a relation between a wavelength of a visible ray and a refractive index of a medium including the polarizing transition member such as the $\lambda/2$ phase difference film.

Figure 2:
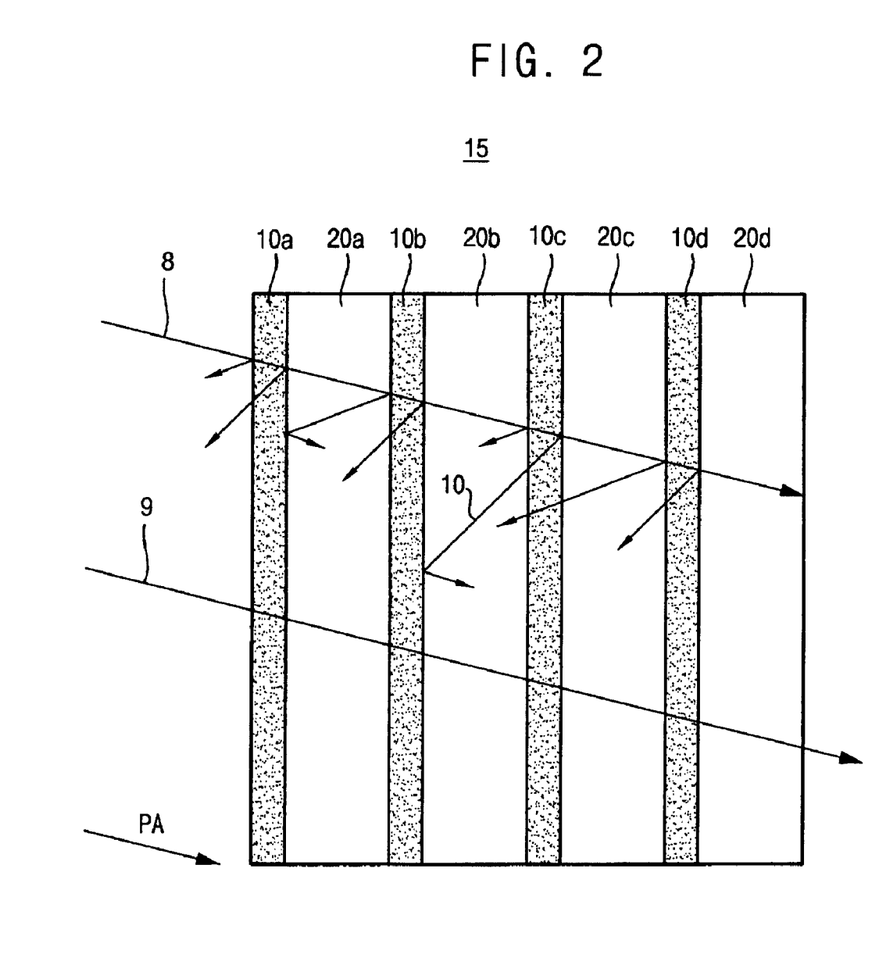
FIG. 2 is a cross-sectional view showing a polarizing member having a relatively high polarizing transmittance.

Referring to the line "A" in FIG. 2, when the wavelength increases, the refractive index decreases. Thus, a reflectivity may increase when the wavelength increases. On the other hand, a transmittance may decrease when the wavelength increases.

Referring to the line "C" in FIG. 2, when the wavelength increases, the refractive index increases. Thus, a reflectivity may decrease when the wavelength increases. On the other hand, a transmittance may increase when the wavelength increases.

Referring to the line "B" in FIG. 2, the line "B" is positioned between the line "A" and the line "C". The medium of line "B" includes the polarizing transition member having the above-described characteristics. When the wavelength increases, the refractive index increases. Thus a reflectivity may decrease when the wavelength increases. On the other hand, a transmittance may increase when the wavelength increases. As a result, a visible ray having a substantially long wavelength may pass through the medium having the polarizing transition member.

FIG. 2 is a cross-sectional view illustrating a polarizing member having a relatively high polarizing transmittance as compared with conventional polarizing members.

Referring to FIG. 2, a polarizing member 15 includes a plurality of anisotropic films and a plurality of isotropic films. In detail, as shown in the non-limiting embodiment of FIG. 2 the polarizing member 15 may include a first anisotropic film 10a, a first isotropic film 20a, a second anisotropic film 10b, a second isotropic film 20b, a third anisotropic film 10c, a third isotropic film 20c, a fourth anisotropic film 10d and a fourth isotropic film 20d.

As illustrated in FIG. 2, the number of the anisotropic films is four. However, many variations of the number of the anisotropic films are possible. For example, the number of the anisotropic films may be less than or equal to four. According to another example, the number of the anisotropic films may be four or more.

As shown in FIG. 2, a first light is incident upon the first anisotropic film 10a in a propagation direction PA. The first light may include a first ray and a second ray. The first ray is polarized in a first direction that is substantially perpendicular to the propagation direction PA. The second ray is polarized in a second direction that is substantially perpendicular to the propagation direction PA. The first direction may be substantially perpendicular to the second direction. For example, the first ray and the second ray may be a vertically polarized ray and a horizontally polarized ray, respectively.

The first anisotropic film 10a has a first refractive index with respect to the first ray and a second refractive index with respect to the second ray.

The first ray may pass through the first anisotropic film 10a without refraction to be incident upon the first isotropic film 20a. The second ray may be reflected by the first isotropic film 10a or pass through the first isotropic film 10a with refraction to be incident upon the first isotropic film 20a.

The first isotropic film 20a may have a refractive index that is substantially identical to the first refractive index. Thus, a second light provided from the first anisotropic film 10a may pass through the first isotropic film 20a without refraction to be incident upon the second anisotropic film 10b.

The first anisotropic film 10a and the first isotropic film 20a together operate as a first polarizing layer having a first polarizing axis.

The second light includes a third ray and a fourth ray. The third ray is polarized in a third direction that is substantially perpendicular to the propagation direction PA. The fourth ray is polarized in a fourth direction that is substantially perpendicular to the propagation direction PA. The third direction may be substantially perpendicular to the fourth direction.

The second anisotropic film 10b has a third refractive index with respect to the third ray and a fourth refractive index with respect to the fourth ray.

The third ray may pass through the second anisotropic film 10b without refraction to be incident upon the second isotropic film 20b. The fourth ray may be reflected by the second anisotropic film 10b toward the first isotropic film 20a or pass through the second anisotropic film 10b with refraction to be incident upon the second isotropic film 20b.

The second isotropic film 20b has a refractive index that is substantially identical to the third refractive index. Thus, a third light provided from the second anisotropic film 10b may pass through the second isotropic film 20b without refraction to be incident upon the third anisotropic film 10c.

The second anisotropic film 10b and the second isotropic film 20b together operate as a second polarizing layer having a second polarizing axis.

The third light includes a fifth ray and a sixth ray. The fifth ray is polarized in a fifth direction that is substantially perpendicular to the propagation direction PA. The sixth ray is polarized in a sixth direction that is substantially perpendicular to the propagation direction PA. The fifth direction may be substantially perpendicular to the sixth direction.

The third anisotropic film 10c has a fifth refractive index with respect to the fifth ray and a sixth refractive index with respect to the sixth ray.

The fifth ray may pass through the third anisotropic film 10c without refraction to be incident upon the third isotropic film 20c. The sixth ray may be reflected by the third anisotropic film 10c toward the second isotropic film 20b or pass through the third anisotropic film 10c with refraction to be incident upon the third isotropic film 20c.

The third isotropic film 20c has a refractive index that is substantially identical to the fifth refractive index. Thus, a fourth light provided from the third anisotropic film 10c may pass through the third isotropic film 20c without refraction to be incident upon the fourth anisotropic film 10d.

The third anisotropic film 10c and the third isotropic film 20c together operate as a third polarizing layer having a third polarizing axis.

The fourth light includes a seventh ray and an eighth ray. The seventh ray is polarized in a seventh direction that is substantially perpendicular to the propagation direction PA. The eighth ray is polarized in an eighth direction that is substantially perpendicular to the propagation direction PA. The seventh direction may be substantially perpendicular to the eighth direction.

The fourth anisotropic film 10d has a seventh refractive index with respect to the seventh ray and an eighth refractive index with respect to the eighth ray. The seventh ray may pass through the fourth anisotropic film 10d without refraction to be incident upon the fourth isotropic film 20d. The eighth ray may be reflected by the fourth anisotropic film 10d toward the third isotropic film 20c or pass through the fourth anisotropic film 10d with refraction to be incident upon the fourth isotropic film 20d.

The fourth isotropic film 20d has a refractive index that is substantially identical to the seventh refractive index. Thus, a fifth light provided from the fourth anisotropic film 10d may pass through the fourth isotropic film 20d without refraction to be irradiated from an upper face of the fourth isotropic film 20d.

The fourth anisotropic film 10d and the fourth isotropic film 20d together operate as a fourth polarizing layer having a fourth polarizing axis.

A refractive index of the fourth polarizing layer may be substantially larger than the refractive index of the third polarizing layer. A refractive index of the third polarizing layer may be substantially larger than the refractive index of the second polarizing layer. A refractive index of the second polarizing layer may be substantially larger than the refractive index of the first polarizing layer.

Thus, the second polarizing axis of the second polarizing layer may form approximately a 30° angle with respect to the first polarizing axis of the first polarizing layer in a clockwise direction. The third polarizing axis of the third polarizing layer may form approximately a 30° angle with respect to the second polarizing axis of the second polarizing layer in the clockwise direction. The fourth polarizing axis of the fourth polarizing layer may form approximately a 30° angle with respect to the third polarizing axis of the third polarizing layer in the clockwise direction.

Alternatively, the second polarizing axis of the second polarizing layer may form approximately a 30° angle with respect to the first polarizing axis of the first polarizing layer in a counterclockwise direction. The third polarizing axis of the third polarizing layer may form approximately a 30° angle with respect to the second polarizing axis of the second polarizing layer in the counterclockwise direction. The fourth polarizing axis of the fourth polarizing layer may form approximately a 30° angel with respect to the third polarizing axis of the third polarizing layer in the counterclockwise direction.

As described above, the anisotropic films and the isotropic films included in the polarizing member may enable the polarizing member 15 to have a relatively high polarizing transmittance as compared with a conventional polarizing member.

The first, second, third, and fourth isotropic films 20a, 20b, 20c and 20d may include an inorganic material having a low refractive index. For example, the inorganic material may include silicon oxide ($SiO_2$), aluminum oxide ($Al_2O_3$), calcium fluoride ($CaF_2$), barium fluoride ($BaF_2$), magnesium fluoride ($MgF_2$), aluminum nitride (AlN), boron nitride (BN), or a combination thereof. Alternatively, the first, second, third, and fourth isotropic films 20a, 20b, 20c and 20d may include an organic material having a low refractive index. The organic material may include a polymer.

The first, second, third and fourth anisotropic films 10a, 10b, 10c and 10d may include an inorganic material. The inorganic material may include titanium oxide ($TiO_2$), magnesium oxide (MgO), zinc sulfide (ZnS), zinc selenide (ZnSe), zirconium oxide ($ZrO_2$), cryolite, or a combination thereof. Alternatively, the first, second, third and fourth anisotropic films 10a, 10b, 10c and 10d may include an organic material. The inorganic material may include a polymer having dichromatic optical characteristics.

Referring again to FIG. 2, the first ray 9 may pass through the anisotropic films and the isotropic films. Thus, an initial optical state of the first ray 9 is substantially identical to a final optical state of the first ray 9. The initial optical state and the final optical state may concern a phase.

A portion of the second ray 8 may pass through the first anisotropic film 10a. The portion is then reflected on the anisotropic films and the isotropic films.

When the refractive indexes of the anisotropic films gradually increase in the propagation direction PD, the portion of the second ray 8 may have optical characteristics that are substantially identical to the first ray 9. Thus, the second ray 8 may pass through the anisotropic films and the isotropic films in the propagation direction PD. As a result, the polarizing member may have the relatively high transmittance as compared with a conventional polarizing member.

In addition, because the polarizing member has a plurality of the anisotropic films and a plurality of the isotropic films, the polarizing member may have the relatively high transmittance regardless of a direction in which the first light is incident upon the first anisotropic film 10a.

A reflected ray 10 in the polarizing member 15 may be continually reflected on the anisotropic films and the isotropic films. The reflected ray 10 may pass through the polarizing member in the propagation direction PA when the refractive indexes of the anisotropic films are gradually increased in the propagation direction PD.

A method of transforming an initial light beam provided from a first side into a final light beam is provided below. Here, the initial light beam includes a first component and a second component.

First, a first ray having the first component in the initial light beam is transmitted to firstly advance toward a second side that is opposite to the first side. A second ray having the second component in the initial light beam is firstly and partially reflected toward the first side. The second ray is firstly and partially transmitted to advance toward the second side.

Second, the first ray is transmitted to secondly advance toward the second side. The firstly transmitted second ray is secondly and partially reflected toward the first side. The firstly transmitted second ray is secondly and partially transmitted to advance toward the second side.

The firstly and partially reflected second ray may be converted into a third ray that includes the first and second components. The third ray may be subject to the first and second operations discussed above.

The secondly and partially reflected second ray may be converted into a fourth ray that includes the first and second components. The fourth ray is subject to the first and second operations discussed above. Most of the final light beam may include the first component.

The first ray may be polarized in a first direction. The second ray may be polarized in a second direction. The first direction may be substantially perpendicular to the second direction.

The second ray may be partially refracted while transmitting the second ray toward the second side.

The above method may further include a third operation and a fourth operation.

Third, the first ray is transmitted to n-thly advance toward the second side. Here, n is a natural number no less than 3. The (n−1)-thly transmitted second ray is n-thly and partially reflected toward the first side. The (n−1)-thly transmitted second ray is n-thly and partially transmitted to advance toward the second side.

Fourth, the third operation is repeated three to n times.

The n-thly and partially reflected second ray may be converted into a (n+1)-th ray including the first and second components. Here, the (n+1)-th ray is subject to the first and second operations.

Figure 3:
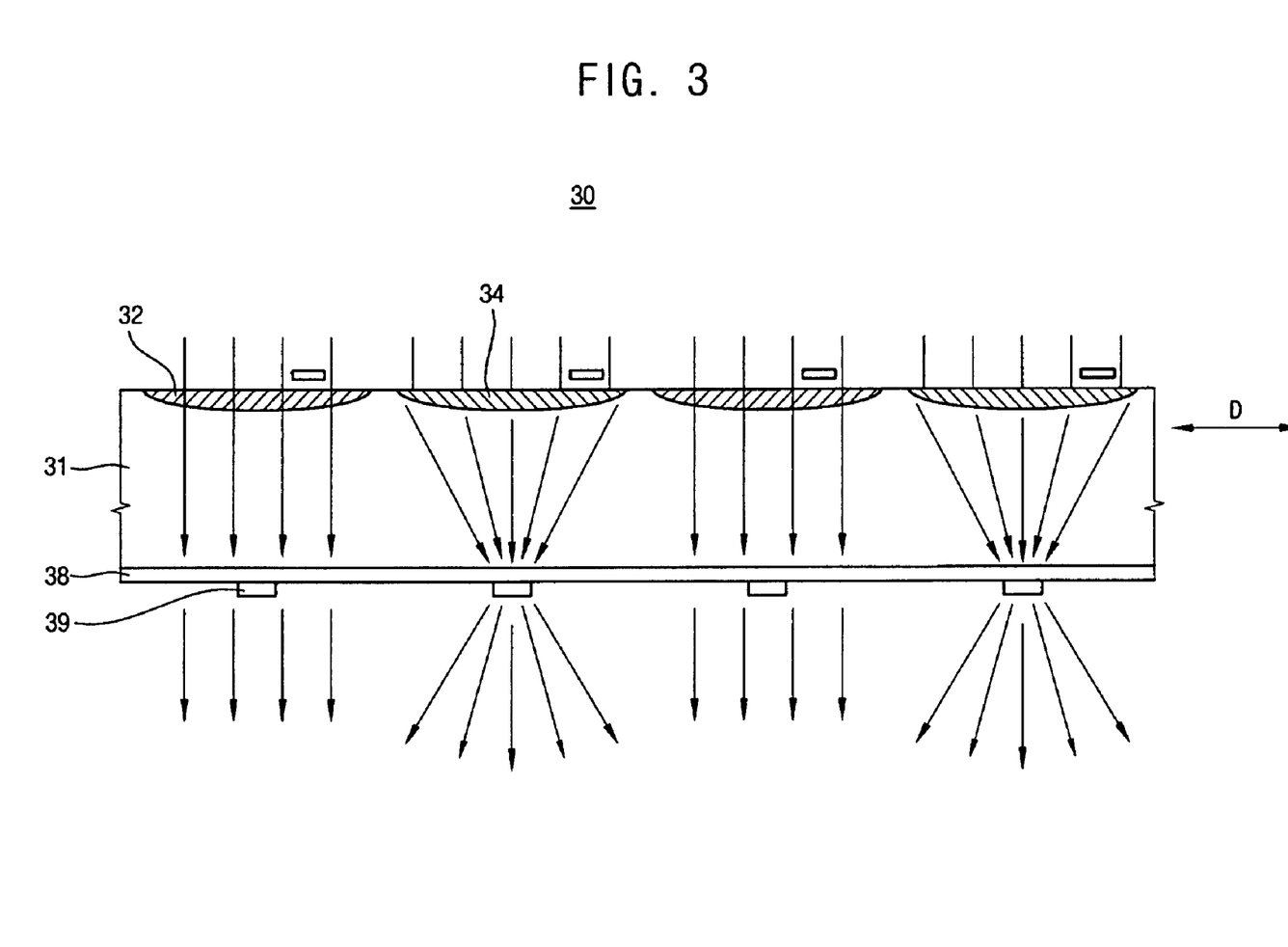
FIG. 3 is a conceptual view illustrating a path of a light passing through a polarizing member.

FIG. 3 is a conceptual view illustrating a path of a light passing through a polarizing member.

Referring to FIG. 3, a polarizing member 30 having a relatively high transmittance includes an isotropic film 31 as compared with a conventional polarizing member, a vertical volume lens 32, a horizontal volume lens 34, a λ/4 phase difference film 38, and a λ/2 phase difference film 39. The vertical volume lens 32 and the horizontal volume lens 34 are positioned over the isotropic film 31. The vertical volume lens 32 performs a vertical polarization operation. The horizontal volume lens 34 performs a horizontal polarization operation.

The λ/4 phase difference film 38 is positioned beneath the isotropic film 31. The λ/2 phase difference film 39 is positioned beneath the λ/2 phase difference film 39. An incident ray that is incident upon the λ/4 phase difference film 38 may be horizontally polarized in λ/4 phase difference film 38 without a phase difference.

The isotropic film 31 has a thickness that enables the ray to pass through the horizontal volume lens 34 and be efficiently concentrated.

Although it is not shown in FIG. 3, the isotropic film includes at least one additional lens. The additional lens may have a radius of curvature capable of refracting the ray irradiated from the horizontal volume lens 34 to concentrate the ray on the λ/2 phase difference film 39.

In FIG. 3, a light axis expands in left and right directions D.

A first ray alone may be irradiated from the vertical volume lens 32. The first ray is polarized in a vertical direction that is substantially perpendicular to the light axis. A second ray alone may be irradiated from the horizontal volume lens 34. The second ray is polarized in a horizontal direction that is substantially in parallel with the light axis.

The horizontal volume lens 34 may include a material having a refractive index that is substantially larger than the refractive index of air. Thus, when the second ray passes through the horizontal volume lens 34, the second ray may be refracted in the horizontal volume lens 34. Thus, the second ray may be concentrated at a portion of the λ/2 phase difference film 39.

An optical path in the polarizing member 30 is described below.

When a non-polarized ray is incident on the vertical volume lens 32, the non-polarized ray may pass through the vertical volume lens 32 and the isotropic film 31 without a phase variation. The non-polarized ray is then incident upon the λ/4 phase difference film 38.

However, when a non-polarized ray is incident upon the horizontal volume lens 34, the non-polarized ray may be refracted by a predetermined angle because the horizontal volume lens 34 includes the material having the refractive index that is substantially larger than the refractive index of air.

The horizontal volume lens 34 has a predetermined radius of curvature that determines a desirable depth of focus, thereby enabling the non-polarized ray to be efficiently concentrated at a portion of the λ/2 phase difference film 39. In addition, a phase of the non-polarized ray may be changed while the non-polarized ray passes through horizontal volume lens 34. Thus, the phase of the non-polarized ray irradiated from horizontal volume lens 34 may become substantially identical to that of the non-polarized ray irradiated from the vertical volume lens 32. As a result, a transmittance of the polarizing member 30 may improve.

As described above, the polarizing member 30 having the relatively high polarizing transmittance may include the vertical volume lens 32 and the horizontal volume lens 34. However, the polarizing member 30 may include coatings of polymer instead of the vertical volume lens 32 and the horizontal volume lens 34. Each of the coatings may have a refractive index that is different from one another.

Figure 4:
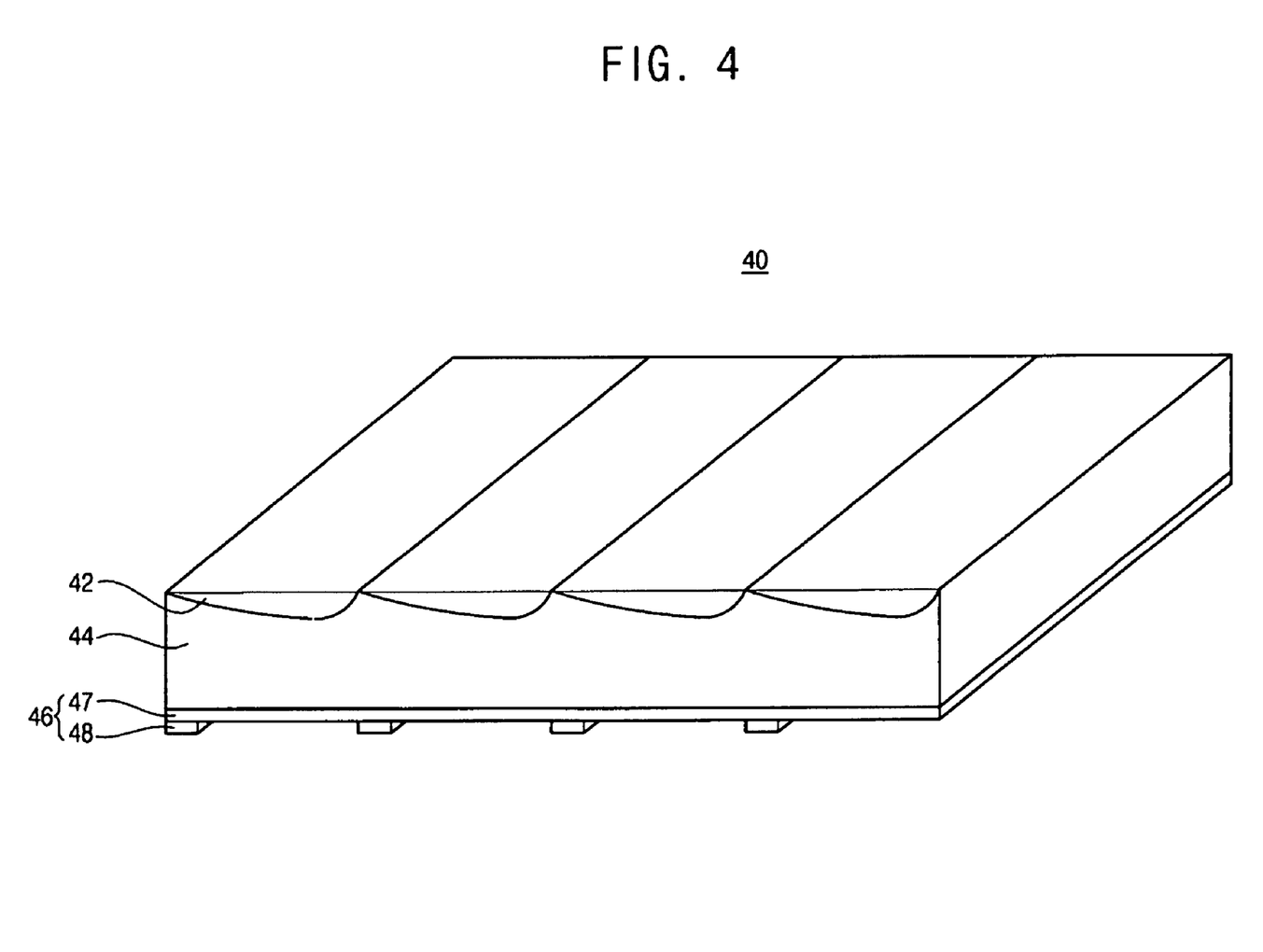
FIG. 4 is a perspective view illustrating a microlens-type polarizing member having a relatively high polarizing transparency in accordance with an embodiment of the invention.

FIG. 4 is a perspective view illustrating a microlens-type polarizing member having a relatively high polarizing transparency according to an embodiment of the invention.

Referring to FIG. 4, a polarizing member 40 may include a polarizing layer 42, an isotropic layer 44, and a polarizing transition layer 46.

The polarizing layer 42 has a predetermined refractive index. The polarizing layer 42 has a volume lens shape. The polarizing layer 42 has a polarizing axis. A light incident upon an upper face of the polarizing layer 42 includes a plurality of rays, e.g., first ray and a second ray. The first ray is polarized in a first direction that is substantially parallel with the polarizing axis so that the first ray may pass through the polarizing layer 42 without changing a phase.

The second ray is polarized in a second direction that is not substantially parallel with the polarizing axis. The second ray may be refracted in the polarizing layer 42 so that the second ray may be concentrated or focused.

The isotropic film 44 is positioned below the polarizing layer 42. The first and second rays irradiated from the polarizing layer 42 may pass through the isotropic film 44 without changing a phase.

The polarizing transition layer 46 may include a λ/4 phase difference film 47 and a λ/2 phase difference film 48. The polarizing transition layer 46 may vary the phase of the second ray incident thereon. Thus, when the second ray passes through the polarizing layer 42, optical characteristics of the second ray may become substantially identical to those of the first ray. For example, when the second ray passes through the polarizing layer 42, the second ray may be polarized in the first direction.

The second ray irradiated from the isotropic film 44 may pass through the λ/4 phase difference film 47. When the second ray passes through the λ/4 phase difference film 47, a wavelength of the second ray may be delayed by λ/4. The second ray is then irradiated from the λ/4 phase difference film 47.

The λ/2 phase difference film 48 has a substantially bar like shape. The λ/2 phase difference film 48 has a predetermined width. The λ/2 phase difference film 48 is formed below the λ/4 phase difference film 47. Each of λ/2 phase difference films 48 is spaced apart from one another. In addition, each of the λ/2 phase difference films 48 is substantially parallel with one another.

When the second ray irradiated from the λ/4 phase difference film 47 passes through the λ/2 phase difference film 48, the wavelength of the second ray may be delayed by λ/2. The second ray is then irradiated from the λ/2 phase difference film 48.

The width of the λ/2 phase difference film 48 is determined by or relates to a depth of focus. The depth of focus may be determined by at least the refractive index of the polarizing layer 42 and a radius of curvature of the polarizing layer 42.

As illustrated in FIG. 4, the λ/2 phase difference films 48 may be formed below the λ/4 phase difference film 47 having a uniform thickness. Alternatively, the λ/2 phase difference films 48 may be formed on the λ/4 phase difference film 47 having the uniform thickness.

Figure 5:
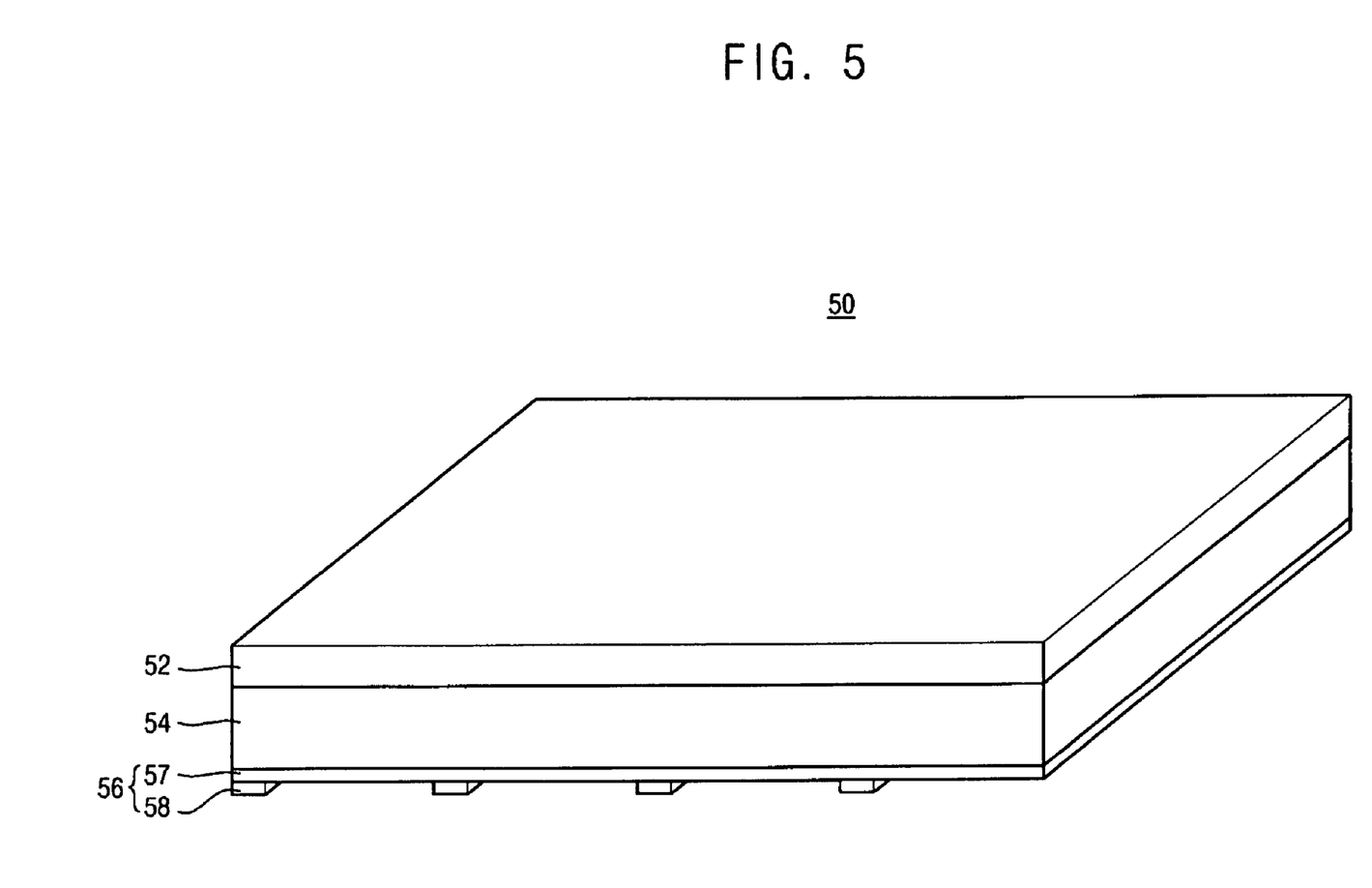
FIG. 5 is a perspective view showing a flat coating type polarizing member having a relatively high transmittance according to an embodiment of the invention.

FIG. 5 is a perspective view illustrating a flat coating type polarizing member having a relatively high transmittance as compared with a conventional polarizing member in accordance with an embodiment of the present invention.

Referring to FIG. 5, a flat coating type polarizing member 50 may include a polarizing layer 52, an isotropic film 54, and a polarizing transition layer 56.

The polarizing layer 52 having a predetermined refractive index has a substantially flat shape and a polarizing axis.

The second ray is polarized in a second direction that is not substantially parallel with the polarizing axis. The second ray may be refracted in the polarizing layer 42 so that the second ray may be concentrated or focused.

The isotropic film 44 is positioned below the polarizing layer 42. The first and second rays irradiated from the polarizing layer 42 may pass through the isotropic film 44 without changing of phases.

The polarizing transition layer 46 may include a λ/4 phase difference film 47 and a λ/2 phase difference film 48. The polarizing transition layer 46 may change the phase of the second ray incident thereon. Thus, when the second ray passes through the polarizing layer 42, optical characteristics of the second ray may become substantially identical to the optical characteristics of the first ray. For example, when the second ray passes through the polarizing layer 42, the second ray may be polarized in the first direction.

In detail, the second ray irradiated from the isotropic film 44 may pass through the λ/4 phase difference film 47. When the second ray passes through the λ/4 phase difference film 47, a wavelength of the second ray may be delayed by λ/4. The second ray is then irradiated from the λ/4 phase difference film 47.

The λ/2 phase difference film 48 may have a substantially bar like shape. The λ/2 phase difference film 48 has a predetermined width. The λ/2 phase difference film 48 is formed below the λ/4 phase difference film 47. Each of the λ/2 phase difference films 48 is spaced apart from one another, and is substantially parallel with one another.

When the second ray irradiated from the λ/4 phase difference film 47 passes through the λ/2 phase difference film 48, the wavelength of the second ray may be delayed by λ/2. The second ray is then irradiated from the λ/2 phase difference film 48.

The width of the λ/2 phase difference film 48 is determined by a depth of focus. The depth of focus may be determined by at least the refractive index of the polarizing layer 42 and a radius of curvature of the polarizing layer 42.

As illustrated in FIG. 5, the λ/2 phase difference films 58 is formed beneath the λ/4 phase difference film 57 having a substantially uniform thickness. Alternatively, the λ/2 phase difference films 58 are formed on the λ/4 phase difference film 57 having substantially the uniform thickness.

Figure 6:
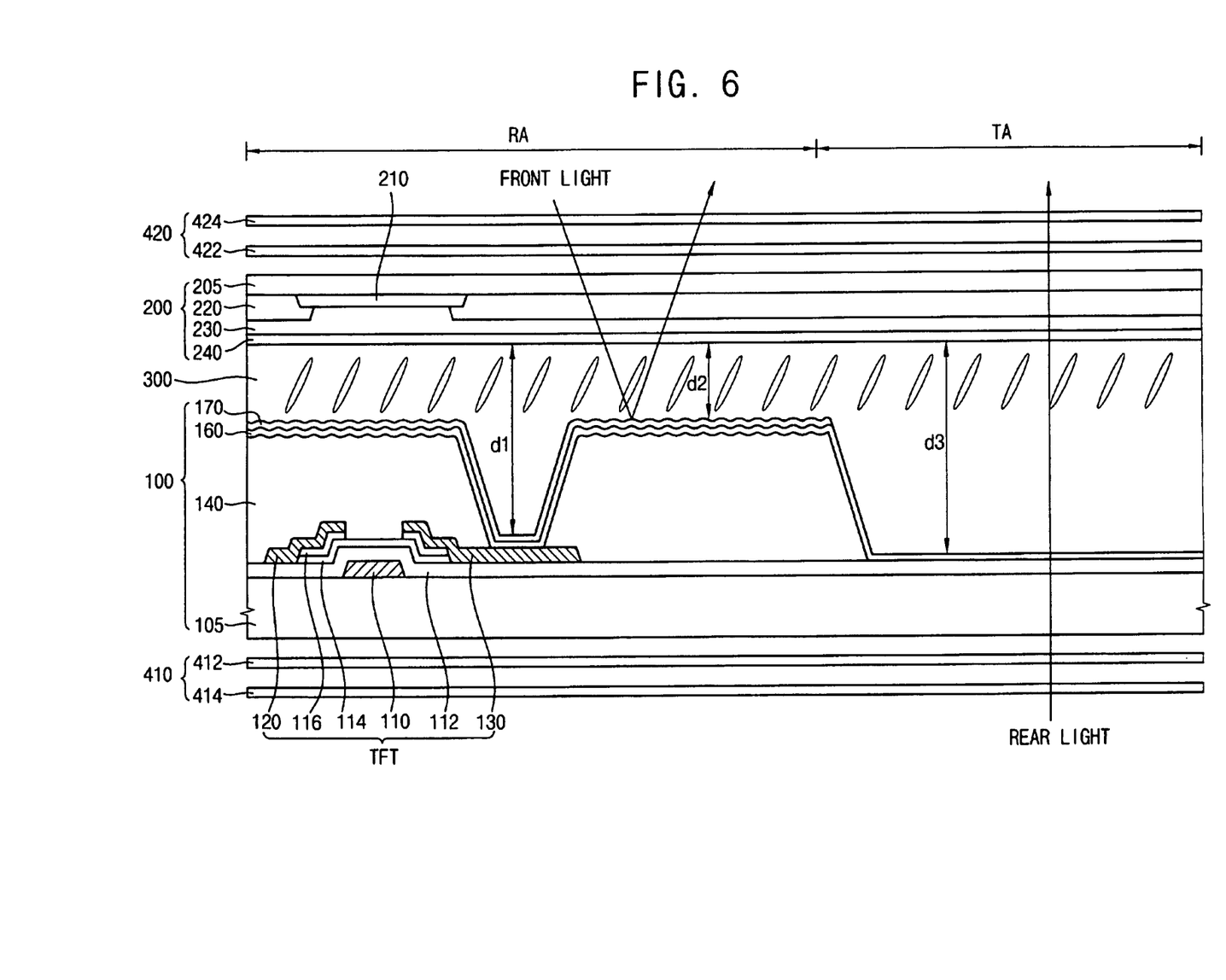
FIG. 6 is a cross-sectional view showing a display device according to an embodiment of the invention.

FIG. 6 is a cross-sectional view illustrating a display device according to embodiment of the invention. In particular, the display device includes a polarizing member having a relatively high transmittance compared with a conventional polarizing member and a dual cell-gap reflective and transmissive liquid crystal panel. The polarizing member is positioned on the dual cell-gap reflective and transmissive liquid crystal panel.

Referring to FIG. 6, a reflective and transparent liquid crystal display device 1000 may include an array substrate 100, a color filter substrate 200, a liquid crystal layer 300, a lower film assembly 410, and an upper film assembly 420.

The liquid crystal layer 300 is positioned between the array substrate 100 and the color filter substrate 200. The lower film assembly 410 is positioned below the array substrate 100. The upper film substrate 420 is positioned above the color filter substrate 200.

The array substrate 100 may include a first transparent layer 105, a switching device TFT, and an organic insulation layer 140.

The switching device TFT is formed on the first transparent layer 105. The switching device TFT may include a gate electrode 110, a gate insulation layer 112, a semiconductor substrate 114, an ohmic contact layer 116, a source electrode 120, and a gate electrode 130.

The gate electrode 110 is formed on the first transparent layer 105. The gate insulation layer 112 is formed on the gate electrode 110 and the transparent layer 105. The semiconductor layer 114 is formed on the gate insulation layer 112. The omhic contact layer 116 is formed on the semiconductor layer 114. The source electrode 120 partially covers the semiconductor layer 114, the omhic contact layer 116 and the source electrode 120. The drain electrode 130 partially covers the semiconductor layer 114, the omhic contact layer 116 and the source electrode 120. The source electrode 120 and the drain electrode 130 are spaced apart from each other so that a semiconductor layer 114 is partially exposed between the source electrode 120 and the drain electrode 130.

The organic insulation layer 140 is formed on the gate insulation layer 112 to cover the switching device TFT. The organic insulation layer 140 exposes a portion of the drain electrode 130 and a portion of the gate insulation layer 112 where a rear light passes through.

A passivation layer (not shown) may be formed on the source electrode 120 and the drain electrode 130 before forming the organic insulation layer 140.

A plurality of lands and a plurality of grooves are formed on an upper surface portion of the organic insulation layer 140. The lands and grooves may improve reflectivity.

The array substrate 100 may include a pixel electrode 130 and a reflection layer 170. The pixel electrode 130 covers the gate insulation layer 112, the portion of the drain electrode 130 and the portion of the gate insulation layer 112, the portion of the drain electrode 130 and the portion of the gate insulation layer 112 being exposed through the gate insulation layer 140.

Because the pixel electrode 160 covers the portion of the drain electrode 130, that is exposed, the pixel electrode 160 may be electrically coupled with the drain electrode 130. The reflection layer 170 partially covers the pixel electrode 160. A first portion where the reflection layer 170 is formed corresponds with a reflection area RA. A second portion where the reflection layer 170 is not formed corresponds with a transmission area TA.

The pixel electrode 160 may be transparent. The pixel electrode 160 may include indium tin oxide (ITO), tin oxide (TO), indium zinc oxide (IZO), or a combination thereof.

The array substrate 100 may include a storage capacitor (Cst) defined by the pixel electrode 160 and a capacitor wire (not shown). The capacitor wire is electrically insulated from the switching device.

Although it is not shown in FIG. 6, an insulating interlayer may be formed between the reflection layer 170 and the pixel electrode 160 to electrically insulate the reflection layer 170 from the pixel electrode 160.

The color filter substrate 200 may include a second transparent layer 205, a black matrix 210, a color pixel layer 220, a surface protection layer 230, and a common electrode 240. The black matrix 210 is formed below the second transparent layer 205. The black matrix 210 may define red pixel areas, green pixel areas, and blue pixel areas. The color pixel layer 220 includes red pixel members, green pixel members and blue pixel members that are formed in the red pixel areas, the green pixel areas and the blue pixel areas, respectively. The surface protection layer 230 is formed below the black matrix 210 and the color pixel layer 220 to protect the black matrix 210 and the color pixel layer 220. The common electrode 240 is formed below the surface protection layer 230.

Alternatively, end portions of the color pixel layers 220 may be overlapped to form a black matrix.

The liquid crystal layer 300 is formed between the array substrate 100 and the color filter substrate 200. When a voltage is applied between the pixel electrode 160 and the common electrode 240, liquid crystals included in the liquid crystal layer 300 may rearrange. Thus, light transparencies of the liquid crystal layer 300 with respect to a front light and a rear light may vary.

The front light may be an artificial light or a natural light.

The liquid crystal layer 300 may include a first portion, a second portion and a third portion. The first portion and the second portion correspond with the reflection area RA. The third portion corresponds with the transmission area TA. In detail, the first portion corresponds with the contact hole 141 and the second portion is positioned between the first portion and the third portion.

The first portion, the second portion and the third portion have a first cell gap d1, a second cell gap d2, and a third cell gap d3, respectively. The first cell gap d1 is positioned over the second cell gap d2. In addition, the first cell gap d1 is not deeper than the third cell gap d3.

A retardation is calculated by multiplying a cell gap (d) and an anisotropic refractive index (Δn) of the liquid crystal molecules in a liquid crystal layer.

A first retardation of the first portion of the liquid crystal layer 300 may be expressed as "Δnd1". A second retardation of the second portion of the liquid crystal layer 300 may be expressed as "Δnd2". A third retardation of the third portion of the liquid crystal layer 300 may be expressed as "Δnd3".

The first cell gap d1, the second cell gap d2 and the third cell gap d3 may be determined according to conditions relating to the liquid crystal molecules in the liquid crystal layer 300 and optical films positioned above and below the liquid crystal layer 300.

For example, the second cell gap d2 may be less than or equal to approximately 1.7 µm thick. The third cell gap d3 may be less than or equal to approximately 3.3 µm thick. The liquid crystal molecules included in the liquid crystal layer 300 may be homogeneously arranged so that a twist angle of the liquid crystal molecule is approximately 0°.

To enable the liquid crystal molecule to have the twist angle of approximately 0°, a first alignment layer (not shown) included in the array substrate 100 and a second alignment layer (not shown) included in the color filter substrate 200 are rubbed in a right direction and a left direction, respectively.

As described above, the pixel electrode 160 of the array substrate 100 and the common electrode 240 of the color filter substrate 200 together may apply voltage to the liquid crystal layer 300.

As illustrated in FIG. 6, the common electrode 240 is formed beneath the surface protection layer 230. Alternatively, the common electrode 240 may be formed on the array substrate 100.

The lower film assembly 410 may include a lower $\lambda/4$ phase difference film 412 and a lower polarizing film 414. The lower $\lambda/4$ phase difference film 412 is positioned below the array substrate 100. The lower polarizing member 414 is positioned below the lower $\lambda/4$ phase difference film 412.

A substantially horizontally polarized ray irradiated from the lower polarizing film 414 is incident upon a lower $\lambda/4$ phase difference film 412. When the horizontally polarized ray passes through the lower $\lambda/4$ phase difference film 412, the horizontally polarized ray may change into a right-circularly polarized light and be incident upon the first transparent layer 105.

The lower polarizing member 414 has a first optical axis.

The rear light includes a parallel rear ray that is substantially parallel with the first optical axis. The parallel rear ray may pass through the lower polarizing member 414 alone and enter the lower $\lambda/4$ phase difference film 412.

A light provided from the array substrate 100 includes a ray polarized in a direction that is substantially in parallel with the first optical axis. The ray may pass through the lower polarizing member 414 alone and be irradiated from a lower face of the lower polarizing member 414.

For example, when the first optical axis is a horizontal optical axis, a horizontally polarized rear ray included in the rear light may pass through the lower polarizing member 414. The horizontally polarized rear ray is then incident upon a lower face of the lower $\lambda/4$ phase difference film 412. A horizontally polarized front ray included in the front light may pass through the lower polarizing member 414 and be irradiated from the lower face of the lower polarizing member 414.

The upper film assembly 420 may include an upper $\lambda/4$ phase difference film 422 and an upper polarizing member 424. The upper $\lambda/4$ phase difference film 422 is positioned above the color filter substrate 200. The upper polarizing member 424 is positioned above the upper $\lambda/4$ phase difference film 422.

When a ray irradiated from the second transparent layer 205 passes through the upper $\lambda/4$ phase difference film 422, a wavelength of the ray is delayed by approximately $\lambda/4$. The ray is then irradiated from an upper face of the upper $\lambda/4$ phase difference film 422.

In addition, when the front light that is incident upon the upper face the upper $\lambda/4$ phase difference film 422 passes through the upper $\lambda/4$ phase difference film 422, a wavelength of the front light is delayed by approximately $\lambda/4$. The front light is then irradiated from the lower face of the upper $\lambda/4$ phase difference film 422.

The upper polarizing member 424 has a relatively high polarizing transmittance as compared with a conventional polarizing member. Therefore, when the front light passes through the upper polarizing member 424, a loss of the front light is relatively low. The front light is then incident upon the upper $\lambda/4$ phase difference film 422.

The upper polarizing film 424 includes a polarizing member. A first ray polarized in a first direction may pass through the polarizing member. The first ray is then incident upon the upper polarizing member 424. However, a second ray polarized in a second direction that is not substantially parallel with the first direction may be refracted in the polarizing member, so that the second ray is concentrated or focused.

The polarizing member may be a microlens-type polarizing member as shown in FIG. 4 and discussed above.

Alternatively, the polarizing member may be a substantially flat coating type polarizing member as shown in FIG. 5 and discussed above.

The polarizing film 424 may include a polarizing transition layer such as a $1/4\lambda$ phase difference film and a $1/2\lambda$ phase difference film. When the second ray passes through the polarizing transition layer, optical characteristics of the second ray may change. One of the optical characteristics may be a phase difference.

The $1/4\lambda$ phase difference film having a substantially uniform thickness may be formed on the $1/2\lambda$ phase difference film having a substantially uniform thickness.

Alternatively, a plurality of the $1/2\lambda$ phase difference films having bar like shapes may be formed on the $1/4\lambda$ phase difference film having a substantially uniform thickness. Each of the $1/2\lambda$ phase difference film may be spaced apart from one another.

The upper polarizing film 424 may include an isotropic layer for adjusting a depth of focus. A ray may pass through the isotropic layer without changing a phase of the ray.

As illustrated in FIG. 6, the polarizing member having a relatively high transmittance may be used in a reflective and transmissive type liquid crystal display device.

Alternatively, the polarizing member may be used in a reflective type liquid crystal display device or in a transmissive type liquid crystal display device.

As illustrated in FIG. 6, the polarizing member having the relatively high transmittance is positioned on the color filter substrate 200 to improve optical characteristics of the front light. Alternatively, the polarizing member may be formed below the array substrate 100 to improve optical characteristics of the rear light.

Figure 7:
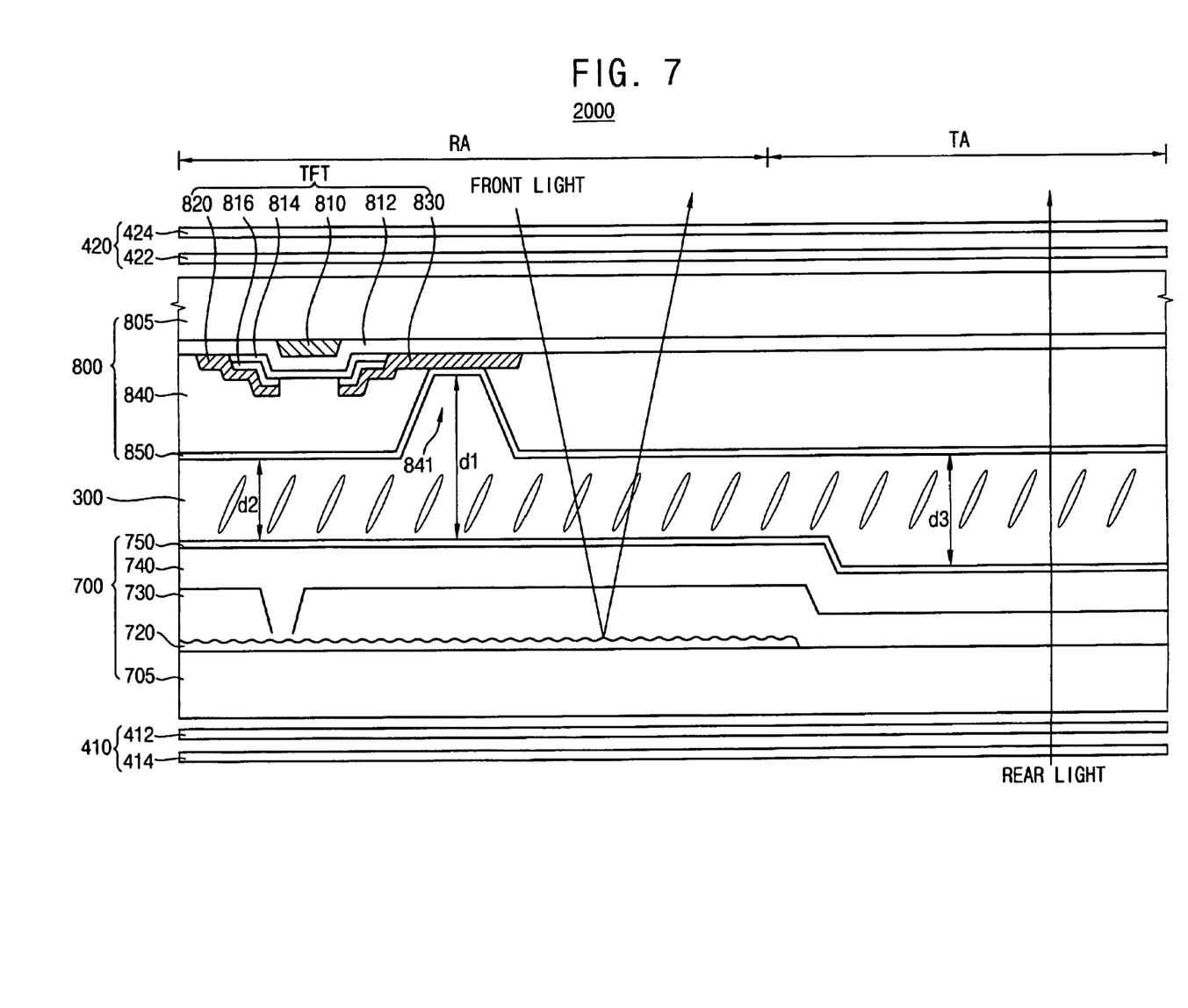
FIG. 7 is a cross-sectional view showing a display device according to an embodiment of the invention.

FIG. 7 is a cross-sectional view illustrating a display device in accordance with an embodiment of the invention. In particular, an optical film having a relatively high polarizing transmittance is positioned on a liquid crystal panel having a color filter on reflector (COR) structure.

Referring to FIG. 7, a liquid crystal display device 2000 includes a color filter substrate 700, an array substrate 800, a liquid crystal layer 300, a lower film assembly 410, and an upper film assembly 420.

The liquid crystal layer 300 is positioned between the color filter substrate 700 and the array substrate 800. The color filter substrate 700 is positioned below the liquid crystal layer 300. The array substrate 800 is positioned above the liquid crystal layer 300.

The color filter substrate 700 may include a first transparent layer 705, a reflection layer 720, a color pixel layer 730, a surface protection layer 740, and a common electrode 750.

The color pixel layer 730 includes color pixel members, such as red pixel members, green pixel members and blue pixel members. The surface protection layer 740 may be formed on the color pixel layer 730 to protect the color pixel layer 730. The common electrode 750 is formed on the surface protection layer 740.

A plurality of lands and a plurality of grooves are formed at an upper face portion of the reflection layer 720 to improve reflectivity.

The liquid crystal device 2000 includes a reflection area RA and a transmission area TA formed or different portions of the liquid crystal device 2000. The transmission area TA is positioned between the reflection areas RA.

The array substrate 800 may include a second transparent layer 805, a switching device TFT, an organic insulation layer 840, and a pixel electrode 850.

The switching device TFT is formed below the second transparent layer 805. The switching device TFT may include a gate electrode 810, a gate insulation layer 812, a semiconductor substrate 814, an ohmic contact layer 816, a source electrode 820, and a gate electrode 830.

The gate electrode 810 is formed below the second transparent layer 805. The gate insulation layer 812 is formed below the gate electrode 810 and the transparent layer 805. The semiconductor layer 814 is formed below the gate insulation layer 812. The omhic contact layer 816 is formed below the semiconductor layer 814. The source electrode 820 partially covers the semiconductor layer 814, the omhic contact layer 816, and the source electrode 820. The drain electrode 830 partially covers the semiconductor layer 814, the omhic contact layer 816, and the source electrode 820. The source electrode 820 is spaced apart from the drain electrode 830 so that the semiconductor layer 814 is partially exposed between the source electrode 820 and the drain electrode 830.

The organic insulation layer 840 is formed below the gate insulation layer 812 to cover the switching device TFT. The organic insulation layer 140 includes a contact hole 841 partially exposing a portion of the drain electrode 830 therethrough.

The pixel electrode 850 is formed below the organic insulation layer 840 and the portion of the drain electrode 830 so that the pixel electrode 850 is electrically coupled with the drain electrode 830.

The pixel electrode 850 may be transparent. The pixel electrode 850 may include indium tin oxide (ITO), tin oxide (TO), indium zinc oxide (IZO), or the like, alone or in combination.

Although it is not shown in FIG. 7, the array substrate 100 may include a storage capacitor (Cst). The pixel electrode 850 and a capacitor wire (not shown) may define the storage capacitor (Cst). The capacitor wire is electrically insulated from the switching device.

The liquid crystal layer 300 is formed between the array substrate 800 and the color filter substrate 700. When a voltage is applied between the pixel electrode 850 and the common electrode 240, liquid crystals included in the liquid crystal layer 300 may rearrange. Thus, light transmissivity of the liquid crystal layer 300 with respect to a front light and a rear light may vary.

The front light may be an artificial light or a natural light.

The liquid crystal layer 300 includes a first portion; a second portion and a third portion. The first portion and the second portion correspond with the reflection area RA. In detail, the first portion corresponds with the contact hole 841. The third portion corresponds with the transmission area TA.

The first portion, the second portion and the third portion have a first cell gap d1, a second cell gap d2 and a third cell gap d3, respectively. The first cell gap d1 is positioned over the second cell gap d2. In addition, the first cell gap d1 is not larger or deeper than the third cell gap d3.

In general, a retardation is calculated by multiplying a cell gap (d) with an anisotropic refractive index ($\Delta n$) of the liquid crystal molecules in a liquid crystal layer 300.

Thus, a first retardation of the first portion of the liquid crystal layer 300 may be expressed as "$\Delta nd1$". A second retardation of the second portion of the liquid crystal layer 300 may be expressed as "$\Delta nd2$". A third retardation of the third portion of the liquid crystal layer 300 may be expressed as "$\Delta nd3$".

The first cell gap d1, the second cell gap d2 and the third cell gap d3 may be determined according to conditions relating to the liquid crystal molecules in the liquid crystal layer 300 and optical films positioned above and below the liquid crystal layer 300.

For example, the second cell gap d2 may be less than or equal to approximately 1.7 μm thick The third cell gap d3 may be less that or equal to approximately 3.3 μm thick.

As described above, the pixel electrode 850 and the common electrode 750 together may be used for applying the voltage to the liquid crystal layer 300.

As illustrated in FIG. 7, the common electrode 750 is formed below the liquid crystal layer 300. Alternatively, the common electrode 750 may be formed below the array substrate 100.

The lower film assembly 710 may include a lower $\lambda/4$ phase difference film 412 and a lower polarizing film 414. The lower $\lambda/4$ phase difference film 412 is positioned under the color filter substrate 700. The lower polarizing member 414 is positioned under the lower $\lambda/4$ phase difference film 412.

A substantially horizontally polarized ray irradiated from the lower polarizing film 414 is incident upon the lower $\lambda/4$ phase difference film 412. When the horizontally polarized ray passes through the lower $\lambda/4$ phase difference film 412, the horizontally polarized ray may change into a right-circularly polarized light and be incident upon the first transparent layer 705.

The lower polarizing member 414 has a first optical axis.

The rear light includes a parallel rear ray that is substantially parallel with the first optical axis. The parallel rear ray may pass through the lower polarizing member 414 alone and enter the lower $\lambda/4$ phase difference film 412.

A light provided from the lower $\lambda/4$ phase difference film 412 includes a ray polarized in a direction that is substantially parallel with the first optical axis. The ray may pass through the lower polarizing member 414 alone and be irradiated from a lower face of the lower polarizing member 414.

For example, when the first optical axis is a horizontal optical axis, a horizontally polarized rear ray included in the rear light may pass through the lower polarizing member 414. The horizontally polarized rear ray is then incident upon a lower face of the lower $\lambda/4$ phase difference film 412. A horizontally polarized front ray included in the front light may pass through the lower polarizing member 414 and be irradiated from the lower face of the lower polarizing member 414.

The upper film assembly 420 may include an upper $\lambda/4$ phase difference film 422 and an upper polarizing member 424. The upper $\lambda/4$ phase difference film 422 is positioned above the array substrate 800. The upper polarizing member 424 is positioned above the upper $\lambda/4$ phase difference film 422.

When a ray irradiated from the second transparent layer 205 passes through the upper $\lambda/4$ phase difference film 422, a wavelength of the ray is delayed by approximately λ/4. The ray is then irradiated from an upper face of the upper λ/4 phase difference film 422.

In addition, when the front light that is incident upon the upper face the upper λ/4 phase difference film 422 passes through the upper λ/4 phase difference film 422, a wavelength of the front light is delayed by approximately λ/4. The front light is then irradiated from the lower face of the upper λ/4 phase difference film 422.

The upper polarizing member 424 has a relatively high polarizing transmittance as compared with a conventional polarizing member. Therefore, when the front light passes through the upper polarizing member 424, a loss of the front light is low. The front light is then incident upon the upper λ/4 phase difference film 422.

The upper polarizing film 424 includes a polarizing member. A first ray polarized in a first direction may pass through the polarizing member. The first ray is then incident upon the upper polarizing member 424. However, a second ray polarized in a second direction that is not substantially parallel with the first direction may be refracted in the polarizing member so that the second ray is concentrated or focused.

The polarizing member may be a microlens-type polarizing member as shown in FIG. 4 and described above.

Alternatively, the polarizing member may be a flat coating type polarizing member as shown in FIG. 5 and described above.

The polarizing film 424 may include a polarizing transition layer, such as a 1/4λ phase difference film and a 1/2λ phase difference film. When the second ray passes through the polarizing transition layer, optical characteristics of the second ray may change. One of the optical characteristics may be a phase difference.

The 1/4λ phase difference film having a substantially uniform thickness may be formed on the 1/2λ phase difference film having a substantially uniform thickness.

Alternatively, a plurality of the 1/2λ phase difference films having bar like shapes are formed on the 1/4λ phase difference film having a substantially uniform thickness. Each of the 1/2λ phase difference films may be apart from one another.

The upper polarizing film 424 may include an isotropic layer for adjusting a depth of focus. A ray may pass through the isotropic layer without changing a phase of the ray.

As shown in FIG. 7, the polarizing member having a relatively high transmittance may be used in a reflective and transmissive type liquid crystal display device. Alternatively, the polarizing member may be used in a reflective type liquid crystal display device or in a transmissive type liquid crystal display device.

As shown in FIG. 7, the polarizing member having the relatively high transmittance is positioned on the color filter substrate 200 to improve optical characteristics of the front light. Alternatively, the polarizing member may be formed below the array substrate 100 to improve optical characteristics of the rear light.

According to an embodiment of the invention, a polarizing film may include a polarizing member, a polarizing transition layer, and an isotropic layer. A first ray polarized in a first direction may pass through the polarizing member. However, a second ray polarized in a second direction that is not substantially parallel with the first direction may be refracted in the polarizing member to concentrate or focus the second ray. When the second ray passes through the polarizing transition layer, optical characteristics of the second ray may change. One of the optical characteristics may be a phase difference. Thus, the second ray may become substantially identical to the first ray when passing through the polarizing layer. The isotropic layer may be used for adjusting a depth of focus. A ray may pass through the isotropic layer without changing a phase.

Since the polarizing film is positioned on and/or under a liquid crystal display panel, the amount of a light incident upon the liquid crystal display panel may increase.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents

What is claimed is:

1. An optical film, comprising:
   an anisotropic film having a first refractive index for a first ray and a second refractive index for a second ray, the first ray and the second ray being included in a light that is incident upon the anisotropic film from a first side in an incident direction, the first ray is polarized in a first direction that is substantially perpendicular to the incident direction, the second ray is polarized in a second direction that is substantially perpendicular to the incident direction, the second ray comprising a first component and a second component, the first ray and the second component of the second ray irradiate from the anisotropic film;
   an isotropic film provided below the anisotropic film, the isotropic film having a third refractive index that is substantially identical to the first refractive index such that the first ray and the second component of the second ray pass through the isotropic film;
   a λ/4 phase difference film provided below the isotropic film to delay a wavelength of the first ray and the second component of the second ray by approximately λ/4 when the first ray and the second component of the second ray pass through the λ/4 phase difference film; and
   a λ/2 phase difference film partially formed below the λ/4 phase difference film to delay the wavelength of the second component of the second ray by approximately λ/2 when the second component of the second ray passes through the λ/2 phase difference film and irradiates toward a second side that is opposite to the first side.

2. The optical film of claim 1, wherein the first direction is substantially perpendicular to the second direction, wherein the first ray passes through the anisotropic film without refraction to be incident upon the isotropic film, and wherein the first component of the second ray reflects from the anisotropic film toward the first side and the second component passes through the anisotropic film with refraction to be incident upon the isotropic film.

3. The optical film of claim 1, wherein the first ray and the second component of the second ray are incident upon the isotropic film and pass through the isotropic film without refraction.

4. The optical film of claim 1, wherein the first direction is substantially perpendicular to the second direction, wherein the first ray passes through the anisotropic film, the isotropic film, the λ/4 phase difference film, and the λ/2 phase difference film, respectively, without refraction, and wherein the first component of the second ray reflects from the anisotropic film toward the first side and the second component of the second ray passes through the anisotropic film with refraction to be incident upon the isotropic film and pass through the isotropic film, the λ/4 phase difference film and the λ/2 phase difference film.

5. The optical film of claim 1, wherein the anisotropic film comprises a first lens pattern.

6. The optical film of claim 5, wherein the first lens pattern has a first radius of curvature to refract the second component of the second ray and concentrate the second component of the second ray on the λ/2 phase difference film.

7. The optical film of claim 5, wherein the isotropic film comprises a second lens pattern.

8. The optical film of claim 7, wherein the second lens pattern has a second radius of curvature to refract the second component of the second ray and concentrate the second component of the second ray on the λ/2 phase difference film.

9. The optical film of claim 1, wherein the anisotropic films and the isotropic films are alternately formed, and wherein the first refractive indexes of the anisotropic films are substantially identical to each other and the second refractive indexes of the anisotropic films are substantially different from each other.

10. The optical film of claim 9, wherein the second refractive indexes increase sequentially in the incident direction.

11. The optical film of claim 9, wherein the second refractive indexes decrease sequentially in the incident direction.

* * * * *